United States Patent [19]
Wilcox

[11] Patent Number: 5,065,623
[45] Date of Patent: Nov. 19, 1991

[54] WATER MONITOR

[76] Inventor: Allen Wilcox, R.R. 1 Box 66a, Danby, Vt. 05739

[21] Appl. No.: 424,659

[22] Filed: Oct. 20, 1989

[51] Int. Cl.$^5$ .............................................. G01F 23/04
[52] U.S. Cl. .................................... 73/290 R; 33/722; 116/227
[58] Field of Search ............ 73/290 R, 151 R, 864.44; 33/718, 719, 722; 47/48.5

[56] References Cited

U.S. PATENT DOCUMENTS

| | | | |
|---|---|---|---|
| 3,613,310 | 10/1971 | Rynberk | 33/718 X |
| 3,745,659 | 7/1973 | Hsu | 33/722 X |
| 4,329,882 | 5/1982 | Kaup | 73/864.44 |
| 4,335,606 | 6/1982 | Michalak | 33/721 X |

FOREIGN PATENT DOCUMENTS 2101232 1/1971 Fed. Rep. of Germany ... 73/864.34

Primary Examiner—Daniel M. Yasich
Attorney, Agent, or Firm—Darby & Darby

[57] ABSTRACT

Method and apparatus for monitoring the water level in the ground in which a casing hole is formed in the ground by driving a solid rod into the ground which compresses the ground material to form a compacted but porous wall for the casing hole. The rigid rod is withdrawn and a perforated tubular member of lesser diameter than the inner diameter of the casing hole is inserted into the casing. The water level rises within the tubular member and a dip-stick is inserted into the top of the tubular member to measure the water level. The dip-stick or the tubular member has a stop to limit the insertion distance of the dip-stick.

4 Claims, 1 Drawing Sheet

FIG. 1
FIG. 2
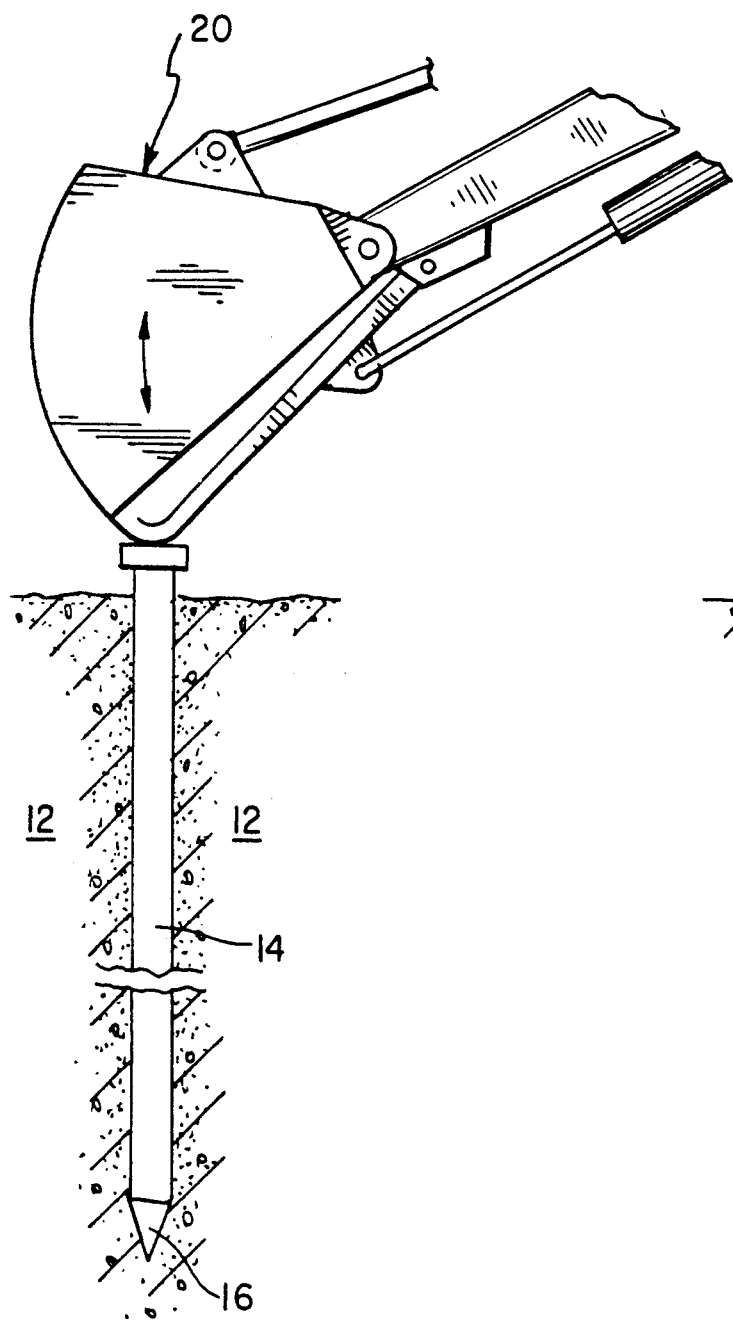
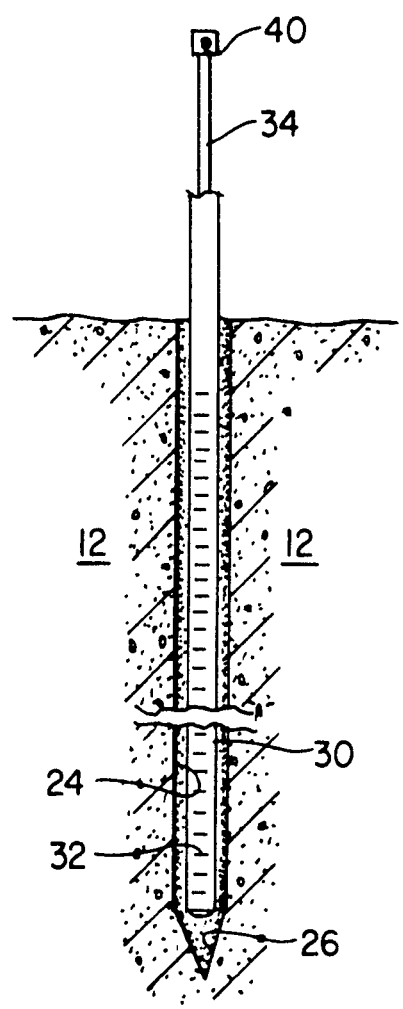

WATER MONITOR

BACKGROUND OF THE INVENTION

Various methods and apparatus are used to determine the water level in the ground. This is of interest in a number of applications, for example, those in which tests are run to determine the water level before foundations are drilled, dug or poured. Other uses are determining the basis for septic to verify elevations between the bottom of the septic system and the water table.

One prior art arrangement for determining the water, level is that disclosed in U.S. Pat. No. 3,613,310 to Rynberk. The object of that patent is basically to provide a structure of a tubular member which is forced into the ground. The liquid then fills up the tubular member and a dip-stick is used to measure the water level. While the device of that patent is operative, it has disadvantages in that the tubular member itself is forced into the ground making installation quite difficult. During installation, the member might become damaged or parts become clogged. Also, there is not full communication of the ground and any water therein with all parts of the tubular member making the device not totally responsive to the ground water conditions.

BRIEF DESCRIPTION OF THE INVENTION

The present invention is directed to a novel method and apparatus for measuring the water level ..in the ground or the liquid level in any other type of medium which is porous and be compacted. In accordance with the invention, a rigid rod is inserted or driven into the ground to the depth at which the water level is to be measured. The rod, being rigid, is driven into the ground and in being so driven it compacts the soil around it to form a casing hole whose surrounding wall is inherently porous. Thereafter the rigid rod is withdrawn and a hollow tubular member of smaller diameter than the casing hole is inserted into the casing hole. The water enters the bottom of the tubular member and rises to a level in the tubular member corresponding to the water table. Thereafter, a dip-stick is inserted into the tubular member so that the water level can be measured directly. Because the right rod is used to form the hole and the hollow tubular member is inserted later into the hole, the tubular member is not damaged and does not become clogged.

OBJECTS OF THE INVENTION

It is therefore an object of the present invention to provide a water monitor to measure the water table of the ground at a given location.

A further object is to provide a water monitor of simple construction using only a tubular member located within a compacted porous ground casing hole.

An additional object is to provide a method of monitoring water in which a rigid rod is driven into the ground to provide a compacted porous casing hole and thereafter a tubular member of lesser diameter than the rod is inserted into the casing hole in which the water level rises.

BRIEF DESCRIPTION OF DRAWINGS

Other objects and advantages of the present invention will become more apparent upon reference to the following specification and the annexed drawings in which:

FIG. 1 is a view showing one step in the method of utilizing the invention; and

FIG. 2 shows the water monitor and its dip-stick.

DETAILED DESCRIPTION OF THE INVENTION

Referring to the drawings, the invention is illustrated and described relative to measuring the water table in the ground. It should be understood that the water table also can be measured in other environments such as storage bins. The ground is illustrated by the area 12 and can be of any composition, for example, ordinary soil, clay, sand, or any combination thereof as would be consistent with the location in which the method and apparatus of the invention is to be utilized.

In accordance with the invention, a casing hole is made by driving a rigid rod or post 14 into the ground to the desired level. The rod 14 has a pointed end 16 to facilitate the driving which is accomplished by a member which can generate a considerable amount of force sufficient to accomplish this. For example, this can be a back hoe whose hopper is illustratively shown by reference numeral 20.

The rigid rod 14 is driven into the ground 12 for suitable distance, for example from 4 feet to 6 feet although other suitable depths can be accommodated. The diameter of the rod 14 can be, for example, from about 3 inches to about 6 inches.

The rod is then withdrawn leaving a casing hole 24 as shown in FIG. 2. The casing hole has the same diameter as the rod 14, this as has been previously described being in the range of from about 3 inches to about 6 inches. The casing hole 24 will have the same configuration as the rod 14 including a pointed end 26 corresponding to the pointed end 16 of the post. The casing hole 24 will be porous although its surrounding wall will be of the compacted ground material.

Since the casing wall is porous, the water from the water table will be able to enter into the casing hole 24 and will rise to the water table level. In addition, the ground water will not leak out of the casing hole since there will be a, rough hydrostatic pressure equivalent existing between the interior of the casing hole 24 and the surrounding ground 12.

A tubular member 30 of a suitable material such as PVC plastic is inserted into the casing hole 24. The diameter of the tubular member 30 is less than that of the casing, in the illustrative example being described in the range of about 2 inches to about 3 inches in diameter. The tubular member 30 has perforations 32 along a substantial portion of its length so that any water which is into the casing hole will enter the tubular member interior. In addition, any water which is at the bottom 26 of the casing will rise in the tubular member through the normal pressure head reaction of a liquid in a pipe. Accordingly, any liquid which comes into the casing 24 will rise within the tubular member to a height corresponding to the water table level in the ground, which is now in the casing.

A dip-stick 3 is inserted into the open end at the calibrated markings thereon so that the water or liquid level within the tubular member 30 can be determined. The dip stick has a stop 40 at its top end on the dip-stick to be inserted into the tubular member will come to rest at a predetermined reference point and there will be a calibration correspondence between the length of the dip-stick and the length of the tubular member. The stop also can be within the tubular member near its bottom. The dip-stick is then withdrawn and the liquid level in the tubular member can be read directly from the dip-stick. The water level is measured from the top of the tubular member to the water table and referenced to the surface grade from there.

As can be seen, a novel method and apparatus of determining the water table in the ground is provided. The tubular member and the dip-stick provide a relatively simple arrangement and the fact that the porous casing hole 24 is formed as part of the method of inserting the water monitor makes the unit highly advantageous.

What is claimed is:

1. A method of monitoring the later level in the ground comprising the steps of:

vertically driving a rigid rod of a first diameter of from about 3 inches to about 6 inches into the ground by application o vertical driving force to form a v vertical casing hole of said first diameter, withdrawing t h rod to leave the vertical casing hole in the ground with an inner wall of the original ground material which is compacted but porous and through which the ground water enters the casing hole, inserting into the vertical ground casing hole a tubular member of diameter from about 2 inches to about 3 inches which is smaller than the casing hole first diameter such that the outer surface of the tubular member does not contact the casing hole wall, said tubular member having an open bottom end so that the water level in the casing hole will rise within the tubular member, and inserting a calibrated dip-stick into the tubular member and thereafter withdrawing it to measure the water level therein.

2. The method of claim 1 wherein the step of driving the rigid rod further comprises making the en of the rod pointed to facilitate the driving into the ground.

3. The method of claim 2 further comprising the step of providing one of the dip-stick and the tubular member with a stop to limit the insertion of the dip-stick into said tubular member.

4. The method of claim 1 further comprising the step of providing a plurality of openings along at least a part of length of the tubular member to permit water in the casing hole to enter the tubular member.

* * * * *